Patented May 27, 1952

2,598,289

UNITED STATES PATENT OFFICE 2,598,289

COMPOSITION OF MATTER COMPRISING A THERMOSETTING CASHEW NUT SHELL OIL MODIFIED PHENOL-FORMALDEHYDE RESIN, A RUBBERY COPOLYMER OF BUTADIENE AND ACRYLONITRILE, AND DIATOMACEOUS EARTH

Ferris E. Newman, New Haven, Ind., assignor to United States Rubber Company, New York, N. Y., a corporation of New Jersey No Drawing. Application June 9, 1949, Serial No. 98,153

5 Claims. (Cl. 260—38)

This invention relates to a new composition of matter having unusual physical properties rendering it highly advantageous for wide use in industry particularly in applications where it is subjected to unusually severe service conditions, for example for the manufacture of silent gears, caster wheels, tumbling barrels, electroplating barrels, etc. The composition of the present invention is particularly characterized by the ease with which it can be manufactured, processed, molded and machined. It is also characterized by the fact that it can be manufactured and processed with the mixing and processing equipment customarily used in the rubber industry. The composition of my invention can be readily converted during manufacture to a powdered or granular form which can be molded directly by heat and pressure or shaped into preforms by simply pressing the powdered or granular material, these preforms being subsequently molded by heat and pressure to form the finished articles.

My invention is based upon the discovery that a composition of matter having remarkable properties can be made by first forming a homogenous mixture of a cashew nut shell oil-modified phenolic resin, particularly a cashew nut shell oil-modified phenol-aldehyde resin, a hardening agent for said resin, particularly a methylene-yielding substance, such as hexamethylenetetramine, which is capable of advancing the resin to the insoluble, infusible stage under the action of heat, a rubbery copolymer of butadiene and acrylonitrile, viz., synthetic rubber of the type known as Buna N and as GR-A, and diatomaceous earth. Upon shaping such a mixture to the desired form and heat-curing it, the shaping and curing typically being effected either by preforming the molding powder by pressure alone, followed by molding of the preform under heat and pressure, or by molding of the mixture directly under heat and pressure, the mixture is converted to a material having an unusual combination of physical properties which adapt it to use in a wide variety of industrial applications, such as those suggested above and many others.

Any cashew nut shell oil-modified phenolic resin made with cashew nut shell oil and a lower molecular weight phenol and capable of being advanced to the insoluble, infusible form when subjected to the action of heat while in intimate admixture with a methylene-yielding substance, typified by hexamethylenetetramine, may be employed in the practice of my invention. Such resins are extremely well-known, being available commercially. An example of such a resin is that known in the trade as Durez No. 12686. The resin may be available commercially with the methylene-yielding hardening agent already present therein, an example being the resin sold as Durez No. 12687 which is a mixture of 92 parts of the resin sold as Durez No. 12686 and 8 parts of hexamethylenetetramine. Still other examples of such resins containing hexamethylenetetramine as the hardening agent are the resins known in the trade as Varcum 9820 and Varcum 9831. Such resins may be made in the manner disclosed in detail hereinafter.

As is well-known, cashew nut shell oil, which is obtained from the outer shell of the cashew nut, is composed largely of anacardic acid which upon heating is decomposed and converted to a long-chain unsaturated phenol, known as cardanol, which has a 7-tetradecenyl side-chain, $-(CH_2)_6-CH=CH(CH_2)_5-CH_3$, in the position meta to the hydroxyl group on the benzene ring. While cashew nut shell oil itself may be used as obtained from the shell, I prefer to use the oil which has been heated to convert it to the phenol just described by decarboxylation in the well-known manner.

The lower molecular weight phenol used in conjunction with the cashew nut shell oil in making the resin is either a monohydric or a polyhydric, preferably the former, monocyclic phenol which contains no substituents on the benzene ring other than hydrogen, hydroxyl groups and lower alkyl side-chains. Examples of such lower molecular weight phenols are phenol itself, and its homologues, such as ordinary cresylic acid which is a mixture containing the three isomeric cresols, the xylenols, etc. Instead of a monohydric phenol, a polyhydric phenol, such as resorcinol, may be used.

While the proportion of cashew nut shell oil used in making the phenolic resin may vary widely, I prefer to use it in an amount ranging from 3 to 12 mole per cent based on the sum of the moles of the cashew nut shell oil and the lower molecular weight phenol. If less than 3 mole-per cent of cashew nut shell oil is used, the phenolic resin may be unduly brittle and consequently may impart objectionable brittleness to the cured blends with the Buna N and the diatomaceous earth. If more than 12 mole per cent of cashew nut shell oil is used, the products obtained may be too flexible and too soft for many applications, including the manufacture of silent gears, although they may be very valuable for other purposes where high flexibility and softness is desired. Within the broad purview of my invention the molar proportion of cashew nut shell oil used in making the resin may be outside the range given; thus it may range from 2 mole per cent up to 50 mole per cent based on the sum of the moles of the cashew nut shell oil and the phenol.

Ordinary phenol is the preferred phenol for making the resin. As ordinary phenol is replaced by cresol, there is a tendency for the resin obtained to become softer with a consequent lowering of the hardness of the cured product.

The resin is typically made by heating a mixture of the lower molecular weight phenol, the cashew nut shell oil (either as such or in the decarboxylated form) and an aldehyde, typically formaldehyde, in the presence of a suitable resin-forming catalyst, usually an acid, such as an inorganic acid, e. g., sulfuric or hydrochloric acid or an acid-reacting material, as zinc chloride, to an oil-soluble stage. During the final stage of the reaction, the resin is advanced to the desired state at which it is still soluble and fusible and capable of being converted to the insoluble, infusible form by the action of an intermixed methylene-yielding hardening agent and heat, and volatile materials are removed therefrom, these objects preferably being accomplished simultaneously by passing superheated steam through the charge until the residual mixture has reached the desired temperature, say 150° C. to 225° C. The residual mixture is then dumped from the kettle and allowed to cool. The cooled resin is then blended with the Buna N and the diatomaceous earth in the manner described hereinafter.

The resins used in accordance with the present invention are characterized by being completely miscible in all proportions with butadiene-acrylonitrile rubbery copolymers of relatively high acrylonitrile content, i. e., containing from 35 to 45%, or even more, of combined acrylonitrile.

As the rubbery copolymer of butadiene and acrylonitrile used in the practice of the present invention, I much prefer to employ those rubbery copolymers containing a relatively high proportion of combined acrylonitrile, say from 35 to 45%, because these rubbery copolymers are completely compatible with the resin whereas rubbery copolymers or lower acrylonitrile content often tend to exhibit somewhat diminished compatibility resulting in somewhat poorer physical properties. A butadiene-acrylonitrile rubbery copolymer which gives unusually satisfactory results in the present invention is that known commercially as Hycar OR-15 which contains about 42% combined acrylonitrile. Another material which gives very excellent results is that known as Perbunan 35 which contains about 35% combined acrylonitrile.

Less preferably, I may use rubbery copolymers of butadiene and acrylonitrile containing less than 35% combined acrylonitrile, say from 15% up to 35%. Examples of such copolymers are those known commercially as Perbunan 26 and Perbunan 18 which contain approximately 26 and 18% acrylonitrile, respectively. As the combined acrylonitrile content is lowered, the compatibility with the phenolic resin tends to progressively decrease and the physical properties of the product tend to be progressively poorer.

The third major component of the composition of the present invention is diatomaceous earth. Any of the forms of granular or powdered diatomaceous earth commonly available commercially may be used in the practice of my invention. Usually the diatomaceous earth has a relatively small particle size. Generally it is so fine that substantially all of it will pass a 100 mesh sieve. Usually the particle size of this material will cover a range of from as large as 100 microns down to particles too small to be seen. I have obtained very satisfactory results using the diatomaceous earth known in the trade as "Dicalite 14W," also known as grade L, put out by The Dicalite Company.

The relative proportions of cashew nut shell oil-modified phenolic resin, rubbery butadiene-acrylonitrile copolymer and diatomaceous earth used in formulating the compositions of the present invention will generally be such that the resin ranges from 20 to 70% and the rubbery copolymer correspondingly ranges from 80 to 30% of the sum of the weights of the resin and rubbery copolymer, and that the proportion of diatomaceous earth ranges from 15 to 60% of the sum of the weights of the resin and the rubbery copolymer.

For most applications, however, particularly where high tensile strength, low elongation, low set and high rigidity are desired, I prefer to employ such relative proportions that the resin ranges from 45 to 70% and the rubbery butadiene-acrylonitrile copolymer correspondingly ranges from 55 to 30% of the sum of the weights of these two ingredients, and that the proportion of diatomaceous earth ranges from 30 to 55% of the sum of the weights of the resin and the rubbery copolymer. By using these preferred proportions, there is obtained a material which has a hardness, abrasion resistance and other properties which adapt it to such applications as silent gears, tumbling barrels, caster wheels, and the like where unusually severe service conditions are encountered.

In addition to the three principal components mentioned above, the composition of my invention also contains a hardening agent, preferably hexamethylenetetramine or its known equivalent, in amount sufficient to advance the resin to hard, infusible, insoluble condition during curing at elevated temperatures. Typically, the amount of hardening agent required to accomplish this is relatively small in proportion to the other components. Usually the proportion of this hardening agent will range from 5 to 10% by weight based on the resin alone.

The composition of the present invention may also contain small amounts of other suitable materials such as mold lubricants, pigments and coloring agents to give the desired color, antioxidants for the rubber, etc. If desired, vulcanizing agents, such as sulfur, and other vulcanizing ingredients, such as the usual vulcanization accelerators and activators, may also be present although they are not necessary and in some cases it is believed that slightly better results are obtained without the use of such rubber vulcanizing agents and ingredients.

The foregoing ingredients are commingled together to form a uniform homogeneous mixture in any suitable manner, typically by means of a Banbury mill or a roll mill of the type used for compounding rubber. The resulting mixture is sheeted out, as on a rubber calender, and is allowed to cool. It is then comminuted, as by chopping or grinding, to a powdered or granulated material of suitable size for use in making preforms or for use directly as a molding powder. It is usually preferable to refrigerate the sheeted stock to facilitate the chopping or grinding.

Typically, the stock is cooled to 35° F., or below, for this purpose. A conventional rotary knife machine may be used for grinding or chopping the mixture.

The resulting granular or powdered material may then be preformed with pressure but without heat to give preforms from which finished articles can be molded by subjecting the preforms to heat and pressure to give the desired shape and cause the material to flow together and thus coalesce to a continuous integral form and at the same time to cause the resin content of the mixture to advance to insoluble, infusible condition and to cure the mixture. The granular or powdered material exhibits the very advantageous property that upon being subjected to moderate pressure (without heat) the particles coalesce to such an extent that there is obtained a preform which retains its integrity even under conditions of plant handling. In this way considerable savings can be effected.

Instead of making preforms, the particulate molding material can be loaded directly into the molding equipment. Whether preformed or not, the material of the present invention can be molded by any of the conventional molding methods such as compression molding or transfer molding or by simple placement into a mold cavity between heated platens and subjection to an elevated temperature, say of the order of 300 to 350° F., and to pressure, say of the order of 100 to 4000 lbs. per square inch, to form a cured sheet, slab or other article. A marked advantage of the mixture of the present invention is that extremely high molding pressures such as are commonly required with the conventional phenolic molding materials, viz., pressures of the order of 2000 lbs. per square inch and over, are not required. Pressures of the order of 200 to 1500 lbs. per square inch are ample for molding the material of the present invention. Another advantage is that the material of the present invention cures very rapidly so that the productivity of the molding equipment is high.

Regardless of the method of forming or shaping the mixture, the molding temperature, pressure and time should, for most applications, be such that the mixture flows properly together to give a solid, uniform, integral, molded article and that the phenolic resin is converted to the insoluble, infusible state. The curing time required may vary widely, say from ten minutes to four hours, depending upon many factors, such as whether or not preforming was used, the thickness of the molding, etc. There seems to be no limit on time beyond which the properties of the material deteriorate. There is however, a minimum time, namely, the time required for complete curing; at the end of this time the physical properties of the mixture have reached their maximum.

The material of the present invention can be molded to very close tolerances. This makes it possible, for example, to mold the material directly into such articles as silent gears with the teeth formed in the mold and with no need for subsequent machining. This is in marked contrast to prior art materials from which silent gears have, of necessity, been made by first molding a blank and then machining this blank into the finished gear. It will be understood, however, that if desired, the material of the present invention can be molded into sheets or blanks which can then be machined to give the desired articles. In this connection, it may be mentioned that one of the marked advantages of the cured material of the present invention is the ease with which it can be machined.

I have further discovered that by carrying out the molding and curing step under a pressure which is lower than that required to give a completely solid product but sufficient to yield a coherent product, there is obtained a cellular product in which the gas cells are closed, i. e., non-interconnecting, and which will float upon water. This product can be made extremely light in weight; its specific gravity may be as low as 0.4. No extraneous blowing agent is needed for the production of this type of product, it being obtained simply by adjustment of the molding pressure; the blowing is believed to be due to the production of gaseous materials, probably steam and ammonia liberated by decomposition of the hexamethylenetetramine, or of a steam or other gaseous materials given off by the resin as it advances to the insoluble, infusible stage, during the molding and curing. Other known blowing agents may, however, be included in the mix if so desired.

The exact nature of the phenomena that occur during the curing of my composition is not yet known with certainty. It is known that the curing advances the resin to the insoluble, infusible form. It is believed that the resin and the rubber components exert a mutual co-curing action upon one another during the curing step but the nature of any such co-curing effect is not understood and I do not wish to be limited by any theory or hypothetical explanation. The fact is that my experiments have conclusively shown that curing of the composition described above gives a product having remarkable properties adapting it to uses for many of which no suitable material of construction was heretofore available.

The material of the present invention presents numerous advantages. A major advantage over hard rubber is the shorter curing time. The product of the present invention is also characterized by its extremely high dimensional stability at high temperatures which is in contrast to the low heat distortion temperature of hard rubber. Furthermore the heat of reaction during curing of the material of the present invention is much less than is the case with hard rubber so that it is possible to make much larger articles or articles having portions of greater thickness. The material of the present invention is particularly characterized by its very high impact strength which is in marked contrast to the relatively low impact strength of ordinary phenolic materials.

The product of my invention has many other advantages including its good electrical characteristics, its resistance to water and to chemicals, its resistance to abrasion and erosion, its toughness, etc.

The following examples illustrate my invention in more detail:

EXAMPLE 1

| | Pounds |
|---|---|
| Hycar OR-15 | 20 |
| Durez 12687 | 20 |
| Dicalite 14W | 20 |
| Zinc stearate (mold lubricant) | 0.3 |
| Iron oxide pigment | 1.8 |
| Anti-oxidant | 0.3 |

These ingredients were intimately mixed in a Banbury mixer, sheeted, cooled to 35° F., and chopped to molding powder. This powder was molded at about 340° F. under pressure sufficient to consolidate it to a solid, continuous mass. The molded product had a tensile strength of 4200 lbs. per square inch, a modulus of elasticity of 180,000 pounds per square inch, a hardness of 65 (Rockwell M scale), a specific gravity of 1.3, a water absorption equal to a 0.3% increase in weight after immersion in water for 24 hours, a heat distortion temperature of 190° F., a dielectric strength of 500 volts per mil., a dielectric constant of 9, a power factor of 0.20, and good arc resistance. It was unusually satisfactory for the manufacture of silent gears and caster wheels, and for lining tumbling barrels.

EXAMPLE 2

| | Pounds |
|---|---|
| Hycar OR-15 | 16 |
| Durez 12687 | 30 |
| Dicalite 14W | 14 |
| Zinc stearate | 0.25 |
| Anti-oxidant | 0.3 |
| Wax | 0.25 |
| Iron oxide pigment | 3.0 |

These ingredients were mixed and processed as previously described. The product was outstanding as a material for the manufacture of electroplating barrels. It had excellent resistance to the chemical substances encountered in electroplating.

EXAMPLE 3

| | Pounds |
|---|---|
| Hycar OR-15 | 10.80 |
| Durez 12687 | 16.56 |
| Dicalite 14W | 10.00 |
| Wax | 0.27 |
| Anti-oxidant | 0.18 |
| Iron oxide pigment | 3.12 |

When mixed and processed as before, this formulation gave an excellent plating barrel.

EXAMPLE 4

| | Pounds |
|---|---|
| Hycar OR-15 | 31.70 |
| Durez 12687 | 8.15 |
| Dicalite 14W | 8.15 |
| Zinc oxide | 1.58 |
| Accelerator | 0.48 |
| Sulfur | 0.48 |
| Anti-oxidant | 0.31 |
| Stearic acid | 0.31 |
| Alpha cellulose | 9.60 |

When mixed and processed as before, this formulation gave a very soft flexible product very useful as a material from which to fabricate diaphragms for pumps handling aviation gasoline.

EXAMPLES 5 to 8

*Preparation of cashew nut shell oil-modified phenol-aldehyde resin*

Resin A.—A resin kettle equipped with stirrer, dropping funnel, reflux condenser and thermometer was charged with 846 g. of phenol, 344 g. of Cardanol 923 (a long-chain unsaturated phenol, being decarboxylated and distilled cashew nut shell oil) and 16 cc. of concentrated hydrochloric acid. This mixture was heated to 110° C. While the mixture was stirred, 640 g. of formalin (37%) was added slowly from the dropping funnel over a period of 45 minutes. The mixture was heated under reflux for 3 hours after addition of the formalin. The condenser was then turned downward for distillation and while the stirring and heating were continued, superheated steam was passed through the mixture until the temperature in the vessel was raised to 160° C. At this point, the resin was poured into trays to cool.

Resin B.—This resin was made in exactly the same way as Resin A except that the superheated steam distillation was continued until the temperature of the residual material in the vessel was raised to 200° C.

*Compounding with Buna N and diatomaceous earth*

Resins A and B were then compounded with Buna N (Examples 5 and 6) and with Buna N and diatomaceous earth (Examples 7 and 8), mixing and processing being effected in the manner described in detail above. All cures were for 10 minutes at 100 p. s. i. (approximately 338° F.). The formulations and the test data on the cured samples were as given in the following table:

| Example | 5 | 6 | 7 | 8 |
|---|---|---|---|---|
| Hycar OR-15 | 100 | 100 | 100 | 100 |
| Resin A | 133.3 | | 133.3 | |
| Resin B | | 133.3 | | 133.3 |
| Dicalite 14W | | | 100 | 100 |
| Red oxide | | | 10 | 10 |
| Anti-oxidant | | | 1.67 | 1.67 |
| Zinc stearate | | | 1.67 | 1.67 |
| Hexamethylenetetramine | 10.67 | 10.67 | 10.67 | 10.67 |

PHYSICAL PROPERTIES

| | | | | |
|---|---|---|---|---|
| Tensile strength, p. s. i | 3,700 | 3,700 | 3,600 | 3,700 |
| Set | .55 | .34 | .07 | .05 |
| Per cent elongation at break | 130 | 80 | 60 | 40 |
| Per cent swelling in cyclohexanone | | 43.7 | 28.1 | 31.2 |
| Condition of swollen stock | N. G. | Very poor | Good | Good |
| Rockwell hardness | 55 | 57-62 | 61-65 | 73 |

From the test data it will be seen that the tensile strengths for Examples 5 to 8 were approximately the same. It is remarkable and surprising that the incorporation of a high proportion (42.9% based on resin plus rubber) of diatomaceous earth in Examples 7 and 8 did not result in a great reduction in tensile strength. The test data further show that the diatomaceous earth greatly lowered the set which is a measure of the extent of return of the material to original dimensions after elongation; the higher the set the poorer the material for those applications where retention of shape under deforming forces is desired. The diatomaceous earth also resulted in markedly reduced swelling in such a powerful solvent as cyclohexanone and in great improvement in the condition of the resulting swollen stock. It also substantially enhanced the hardness.

Having thus described my invention, what I claim and desire to protect by Letters Patent is:

1. A composition of matter comprising an uncured homogeneous mixture consisting essentially of a binder consisting of a cashew nut shell oil-modified lower molecular weight phenol-formaldehyde resin capable of being converted to the insoluble, infusible form by the action of a methylene-yielding hardening agent and heat, a methylene-yielding hardening agent for said resin, and a rubbery copolymer of butadiene and acrylonitrile containing at least 15% of combined acrylonitrile, and a filler consisting of diatomaceous earth, said resin and said copolymer being present in proportions of from 45 to 70% by weight of said resin and correspondingly from 55 to 30% by weight of said copolymer, said last two percentages being based on the sum of said resin and said copolymer, the proportion of said hardening agent being from 5 to 10% by weight based on said resin, said diatomaceous earth being present in a proportion of from 30 to 55% by weight based on the sum of said resin and said copolymer.

2. A composition of matter comprising a heat-cured homogeneous mixture consisting essentially of a binder consisting of a cashew nut shell oil-modified lower molecular weight phenol-formaldehyde resin capable of being converted to the insoluble, infusible form by the action of a methylene-yielding hardening agent and heat, a methylene-yielding hardening agent for said resin, and a rubbery copolymer of butadiene and acrylonitrile containing at least 15% of combined acrylonitrile, and a filler consisting of diatomaceous earth, said resin and said copolymer being present in proportions of from 45 to 70% by weight of said resin and correspondingly from 55 to 30% by weight of said copolymer, said last two percentages being based on the sum of said resin and said copolymer, the proportion of said hardening agent being from 5 to 10% by weight based on said resin, said diatomaceous earth being present in a proportion of from 30 to 55% by weight based on the sum of said resin and said copolymer.

3. A composition of matter comprising an uncured homogeneous mixture consisting essentially of a binder consisting of a cashew nut shell oil-modified lower molecular weight phenol-formaldehyde resin capable of being converted to the insoluble, infusible form by the action of hexamethylenetetramine and heat, hexamethylenetetramine as a hardening agent for said resin, and a rubbery copolymer of butadiene and acrylonitrile containing at least 15% of combined acrylonitrile, and a filler consisting of diatomaceous earth, said resin and said copolymer being present in proportions of from 45 to 70% by weight of said resin and correspondingly from 55 to 30% by weight of said copolymer, said last two percentages being based on the sum of said resin and said copolymer, the proportion of said hexamethylenetetramine being from 5 to 10% by weight based on said resin, said diatomaceous earth being present in a proportion of from 30 to 55% by weight based on the sum of said resin and said copolymer.

4. A composition of matter comprising a heat-cured homogeneous mixture consisting essentially of a binder consisting of a cashew nut shell oil-modified lower molecular weight phenol-formaldehyde resin capable of being converted to the insoluble, infusible form by the action of hexamethylenetetramine and heat, hexamethylenetetramine as a hardening agent for said resin, and a rubbery copolymer of butadiene and acrylonitrile containing at least 15% of combined acrylonitrile, and a filler consisting of diatomaceous earth, said resin and said copolymer being present in proportions of from 45 to 70% by weight of said resin and correspondingly from 55 to 30% by weight of said copolymer, said last two percentages being based on the sum of said resin and said copolymer, the proportion of said hexamethylenetetramine being from 5 to 10% by weight based on said resin, said diatomaceous earth being present in a proportion of from 30 to 55% by weight based on the sum of said resin and said copolymer.

5. A composition of matter comprising a heat-cured homogeneous mixture consisting essentially of a binder consisting of a cashew nut shell oil-modified lower molecular weight phenol-formaldehyde resin capable of being converted to the insoluble, infusible form by the action of hexamethylenetetramine and heat, hexamethylenetetramine as a hardening agent for said resin, and a rubbery copolymer of butadiene and acrylonitrile containing at least 15% of combined acrylonitrile, and a filler consisting of diatomaceous earth, said resin, said copolymer and said diatomaceous earth being present in substantially equal proportions by weight, the proportion of said hexamethylenetetramine being from 5 to 10% by weight based on said resin.

FERRIS E. NEWMAN.

REFERENCES CITED

The following references are of record in the file of this patent:

UNITED STATES PATENTS

| Number | Name | Date |
|---|---|---|
| 2,532,374 | Shepard et al. | Dec. 5, 1950 |

FOREIGN PATENTS

| Number | Country | Date |
|---|---|---|
| 511,368 | Great Britain | Aug. 17, 1939 |

OTHER REFERENCES

Shepard et al., Modern Plastics, pp. 154–156, 210, 212, October, 1946.

Cummins, Modern Plastics, pp. 57 and 58, October, 1936.

Compounding Ingredients for Rubber, 2nd ed., pub. 1947 by India Rubber World, N. Y., pp. 349, 350, 351.